United States Patent
Shim et al.

(10) Patent No.: US 7,457,219 B2
(45) Date of Patent: Nov. 25, 2008

(54) DISC TYPE RECORDING MEDIUM ON WHICH ADDITIONAL INFORMATION IS RECORDED BY FORMING A DISC TRACK, METHOD OF FORMING DISC TRACK, AND RECODING MEDIUM FOR RECORDING PROGRAMS EXECUTING THE METHOD

(75) Inventors: Jae-seong Shim, Seoul (KR); Hyun-soo Park, Seoul (KR); Jin-han Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 10/830,076

(22) Filed: Apr. 23, 2004

(65) Prior Publication Data
US 2004/0233818 A1 Nov. 25, 2004

(30) Foreign Application Priority Data
May 20, 2003 (KR) .................... 10-2003-0032087

(51) Int. Cl.
*G11B 20/10* (2006.01)
(52) U.S. Cl. ................. 369/59.25; 369/59.25; 369/111; 369/275.3
(58) Field of Classification Search .............. 369/59.25, 369/111, 275.3
See application file for complete search history.

(56) References Cited
U.S. PATENT DOCUMENTS 5,615,192 A * 3/1997 Kikukawa et al. ........ 369/47.17
5,848,050 A * 12/1998 Nagasawa et al. ........ 369/275.4
6,160,776 A * 12/2000 Seo ............................ 369/47.1
6,278,565 B1 * 8/2001 Yoon ............................ 360/46
2007/0076548 A1 * 4/2007 Maegawa ................. 369/47.31

FOREIGN PATENT DOCUMENTS

EP 1291857 A1 3/2003
WO WO02/075742 A1 9/2002

OTHER PUBLICATIONS

Office Action issued in Chinese Patent Application No. 2004100458514 on Sep. 9, 2005.

* cited by examiner

*Primary Examiner*—Joseph Feild
*Assistant Examiner*—Parul Gupta
(74) *Attorney, Agent, or Firm*—Stein, McEwen & Bui, LLP

(57) ABSTRACT

A disc type recording medium on which information is recorded by forming disc tracks thereon, a method of forming the disc tracks, and a recording medium for recording a program executing the method. In the above media and method, data access can be rendered in data frame units. The disc type recording medium includes a data frame composed of a plurality of sync frames. The total number of the sync frames is determined according to the length of the innermost circumference of the disc type recording medium. Accordingly, recoding the additional information in such a data frame format prevents a reduction in a rate of detecting the additional information even when the recording medium is miniaturized.

21 Claims, 5 Drawing Sheets

DISC TYPE RECORDING MEDIUM ON WHICH ADDITIONAL INFORMATION IS RECORDED BY FORMING A DISC TRACK, METHOD OF FORMING DISC TRACK, AND RECODING MEDIUM FOR RECORDING PROGRAMS EXECUTING THE METHOD

CROSS-REFERENCE TO RELATED APPLICATIONS

This application claims the benefit of Korean Patent Application No. 2003-32087, filed on May 20, 2003, in the Korean Intellectual Property Office, the disclosure of which is incorporated herein in its entirety by reference.

BACKGROUND OF THE INVENTION

1. Field of the Invention

The present invention relates to a disc type recording medium on which additional data is recorded by forming disc tracks, and more particularly, to a method of recording additional information by forming groove tracks or land tracks in a disc in wobble formats and a storage medium for recording the additional information.

2. Description of the Related Art

A variety of data modulation methods can be used to form tracks on a disc type recording medium. For instance a disc track can be formed by modulating physical address information in a wobble format using binary phase shift key (BPSK) modulation. The address information is then obtained by demodulating a wobble signal according to a signal detected at the formed track.

Figure 1:
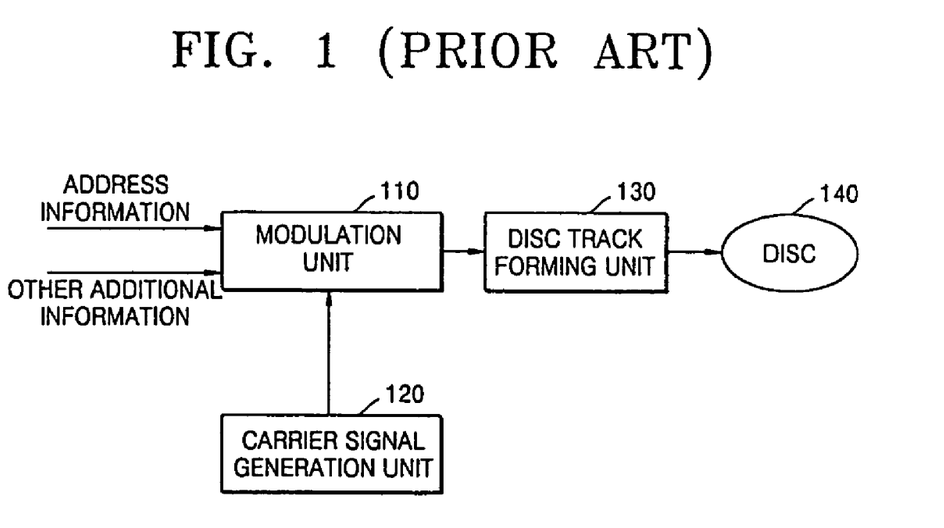
FIG. 1 is a block diagram illustrating a conventional disc track forming apparatus.

FIG. 1 is a block diagram illustrating a structure of a conventional track forming apparatus for explaining a method of recording an address and additional information on a disc track. The apparatus of FIG. 1 includes a modulation unit 110, a carrier signal generation unit 120, and a disc track forming unit 130.

The modulation unit 110 modulates a carrier signal, which is generated by the carrier signal generation unit 120, by multiplying the input address and additional information by the carrier signal.

A modulation signal corresponding to the modulated address and additional information is input to the disc track forming unit 130. The disc track forming unit 130 forms a wobble corresponding to the input modulation signal on the disc track. The modulation unit 110 modulates the carrier signal using the BPSK modulation based on the address and additional information, and forms the modulated carrier signal on a disc track in the form of a wobble. As a result, a wobble signal having the same shape as the modulated carrier signal can be detected from the disc track.

Figure 2:
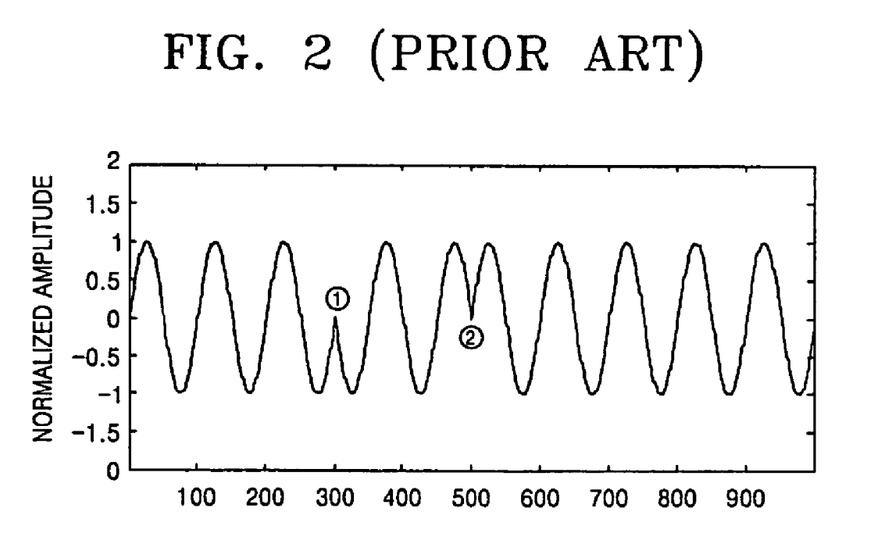
FIG. 2 illustrates binary phase shift key (BPSK) modulation used in a conventional disc track forming method.

FIG. 2 illustrates the BPSK modulation used in a conventional disc track forming method. As is apparent from points ① and ② shown in FIG. 2, information such as address information is read by reversing the phases of various portions of a wobble into which the address information is to be inserted. However, reversing the phases causes discontinuities of the wobble signal at the points ① and ②. The discontinuities of the wobble signal negatively affect wobble signals detected along adjacent tracks, causing signal deterioration and harmonic noise.

Figure 3:
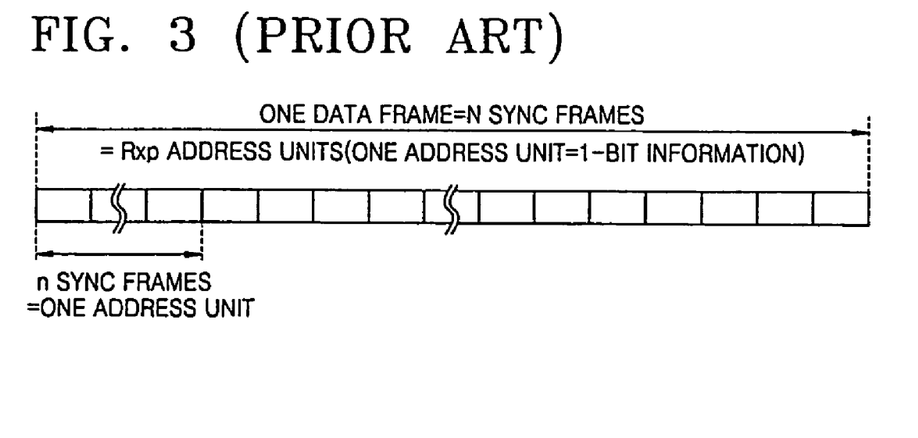
FIG. 3 illustrates a structure of a conventional data frame comprising N sync frames.

FIG. 3 illustrates a structure of a data frame recorded on an optical disc, the data frame comprising N sync frames which contain address information and/or other additional information such as disc recording conditions and copyright protection policies for disc access.

In an optical disc, data access is rendered in data frame units. As is shown in the data frame of FIG. 3, the address information as well as other additional information is expressed with p address units and repetitively recorded R times to increase the reliability of the information. Here, the length of an address unit corresponds to the lengths of n sync frames. In general, the address unit is a base unit for recording the address information and other additional information in a data frame containing 1-bit information. In this disclosure, it is considered that an individual data frame has its own address value and is a basic data unit for data access, and an address in pregroove (ADIP) is a basic unit for expressing information.

Use of discs in portable appliances such as mobile phones necessitates the miniaturization of optical discs. In these miniaturized discs, information of data frame length is recorded on two tracks along the circumference of a particular track of a disc, e.g., the innermost track, and the track length is shorter than a data frame length. When this occurs, an optical disc is likely to have a radial discontinuity. The discontinuity results in errors at at least two points of a data frame, thus remarkably reducing the rate of detecting the address and other additional information recorded in the data frame.

As described above, in the case of a conventional wobble formation method using BPSK modulation, discontinuities of the wobble signal are caused when reversing the phase of the wobble to record information such as address information in the wobble. Also, when forming a disc track using a data frame in a conventional format where the data frame is longer than a particular disc track, the optical disc develops a radial discontinuity resulting in errors at at least two points of the data frame. Such discontinuities remarkably reduce the rate at which address information or other additional information contained in the data frame can be detected.

A conventional method of recording address information by forming a wobbling groove in a disc type recording medium is disclosed in European Patent No. 1291857, filed on Mar. 12, 2003.

SUMMARY OF THE INVENTION

The present invention provides a recording medium for recording additional information in an extensible format, thereby preventing a reduction in a rate at which additional information is detected due to miniaturization of the recording medium.

The present invention also provides an improved disc track formation method and a recording medium in which disc tracks are formed using the improved disc track formation method.

According to an aspect of the present invention, there is a disc type recording medium on which data access is allowed in data frame units and additional information is recorded by forming a disc track, the medium comprising at least one data frame including a plurality of sync frames, wherein the number of the plurality of sync frames is determined according to the length of the innermost circumference of the disc type recording medium.

According to an aspect of the present invention, the number of the plurality of sync frames is N/d, wherein d is determined such that the length of the data frame is shorter than or the same as the length of the innermost circumference of the disc type recording medium, and N and d are positive integers.

According to an aspect of the present invention, n/d sync frames are used to express a predetermined unit of information, wherein d is determined such that the length of the data frame is shorter than or the same as the length of the innermost circumference of the disc type recording medium, and n is a positive integer that is smaller than N.

According to an aspect of the present invention, a period of a wobble, which is used to form the tracks of the disc type recording medium, is MT when the data frame includes N sync frames, and the period of the wobble is MT when the data frame includes N/d sync frames and M/d is not a positive integer, wherein T, t, and M are the period of a one-channel clock, T/d, and a positive integer, respectively.

According to an aspect of the present invention, a clock for data recording is obtained by dividing the period T of the clock by d when the period of a wobble is MT and the period of the clock obtained using a phase locked loop (PLL) is T/d.

According to an aspect of the present invention, n sync frames are used to express a predetermined unit of information, wherein the predetermined unit of information is determined such that the length of the data frame is shorter than or the same as the length of the innermost circumference of the disc type recording medium, and n is a positive integer.

According to another aspect of the present invention, there is a disc type recording medium for recording additional information by forming disc tracks, the medium comprising at least two first sections, where the disc tracks are formed using a first function, and at least one second section, where the disc tracks are formed using a second function at a frequency, which is 1/k times the frequency of the first function, wherein the second section is positioned between the first sections, and k is a positive integer.

According to yet another aspect of the present invention, there is a disc type recording medium for recording additional information by forming disc tracks, the medium comprising at least two first sections in which the disc tracks are formed using a first function, and at least one second section in which the disc tracks are formed using a second function, the second section positioned between the first sections, wherein the difference between primary differential values of the first and second function at points where the first sections and the second section meet is less than 50% of the primary differential value of the first function, and the second function has a point at which the primary differential value is 0 or does not include discontinuities.

According to still another aspect of the present invention, there is a method of forming disc tracks for recording additional information, the method comprising forming disc tracks using a first function in at least two first sections of a disc type recording medium; and forming disc tracks using a second function in a second section of the disc type recording medium, wherein the second function has a frequency that is 1/n times the frequency of the first function, and the second section is positioned between the first sections.

According to still another aspect of the present invention, there is a method of forming disc tracks for recording additional information, the method comprising forming disc tracks using a first function in at least two first sections of a disc type recording medium, and forming disc tracks using a second function in a second section of the disc type recording medium, wherein the second section is positioned between the first sections and the difference between primary differential values of the first and second function at points where the first sections and the second section meet is less than 50% of the primary differential value of the first function, and the second function used in the second section has a point at which the primary differential value is 0 or does not include discontinuities.

According to still another aspect of the present invention, there is a computer readable recording medium for recording a program that executes a method of forming disc tracks for recording additional information, wherein the method comprises forming disc tracks using a first function in at least two first sections of the computer readable recording medium, and forming disc tracks using a second function in a second section of the computer readable recording medium, wherein the second section is positioned between the first sections and the difference between primary differential values of the first and second function at points where the first sections and the second section meet is less than 50% of the primary differential value of the first function, and the second function used in the second section has a point at which the primary differential value is 0 or does not include discontinuities.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
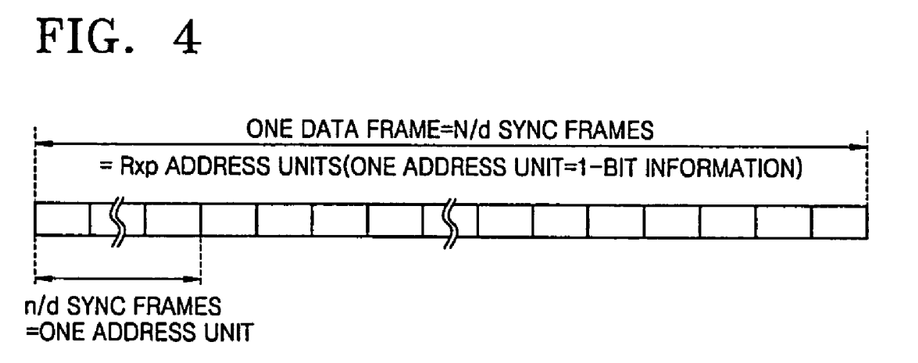
FIG. 4 illustrates a structure of an extensible format according to an aspect of the present invention.

FIG. 4 illustrates a structure of a data frame in an extensible format according to an aspect of the present invention.

In this aspect, when a data frame, which is a basic unit for disc access, is longer than a particular track, e.g., the innermost circumference of a disc, a data frame is recorded in an extensible format so as to make the data frame shorter than the innermost circumference of the disc. The extensible format is compatible with a conventional data frame.

Referring to FIG. 3, a data frame and an address unit recorded in a conventional format are N sync frames long and n sync frames long, respectively, whereas a data frame and an address unit in the extensible format, shown in FIG. 4 according to an aspect of the present invention, are reduced to be N/d sync frames long and n/d sync frames long, respectively. Similarly, other p address units are recorded R times. Accordingly, data structures of the address and other additional information in a data frame, and an error correction standard are the same as those of the conventional data frame thus allowing application of a conventional data decoding technique to the data frame according to an aspect of the present invention. For this reason, the data frame can be compatible with a conventional data frame. According to an aspect of the present invention, N and n are 496 and 2, or 298 and 2, respectively.

When the lengths of the data frame and address unit are reduced as shown in FIG. 4, the period of the wobble is determined to be shorter than that of a wobble used in a conventional data frame, i.e., when a data frame and an address unit are N sync frames long and n sync frames long, respectively. One reason for determining one period of the wobble according to the aspect of the present invention described above is that the ratio of wobbles, which undergo data modulation such as binary phase shift key (BPSK) modulation, is preferably smaller. If a period of a wobble used in a data frame in the conventional format is MT (T denoting a period of a channel clock) and M is divided by d, leaving a remainder, a wobble whose period, i.e., MT/d, is d times faster than a period of a wobble used in the data frame in the conventional format is used.

When a disc track is formed using a wobble signal with a period that is d times faster than the period of a wobble used in the structure of a conventional format data frame, a clock period generated from a wobble signal, which is generated at the disc track formed for data recording using a phase lock loop (PLL), is T/d. The period of a clock used for data recording is obtained by demultiplying T/d by d.

Figure 5:
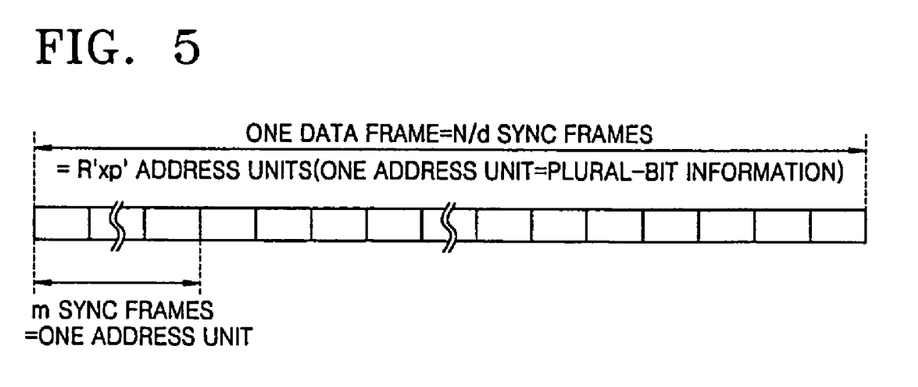
FIG. 5 illustrates a structure of an extensible format according to another aspect of the present invention.

FIG. 5 illustrates a structure of a data frame in an extensible format according to another aspect of the present invention.

Compared to the conventional data frame and the address unit shown in FIG. 3, the lengths of a data frame and an address unit in an extensible format are N/d sync frames long and m sync frames long, respectively, where m is the number of data frames in one address unit, and m is less than n. At the same time, information recorded in the address unit is increased from 1 bit to a plurality of bits. Thus, the total number of address units, which are basic units for recording the address and other additional information, can be reduced to p' (p>p'). Although the total number of address units is decreased, it is possible to minimize the error rate by increasing a number of times the p address units are recorded to R' or by increasing the total number of parities for error correction.

When the physical length of a data frame in an extensible format according to this aspect of the present invention is too short to contain all of the information, it is possible to record all of the information by including plural-bit information within an address unit while increasing the total number of parities for error correction so as to reduce the error rate.

A modified BPSK modulation is used to solve the problems of the BPSK modulation used in the conventional track formation method shown in FIG. 2. The discontinuities of the wobble are caused by reversing the phase of a portion of the wobble into which information such as address information is to be inserted, as well as degradation of the wobble signal, and harmonic noise generated at an adjacent track.

Figure 6:
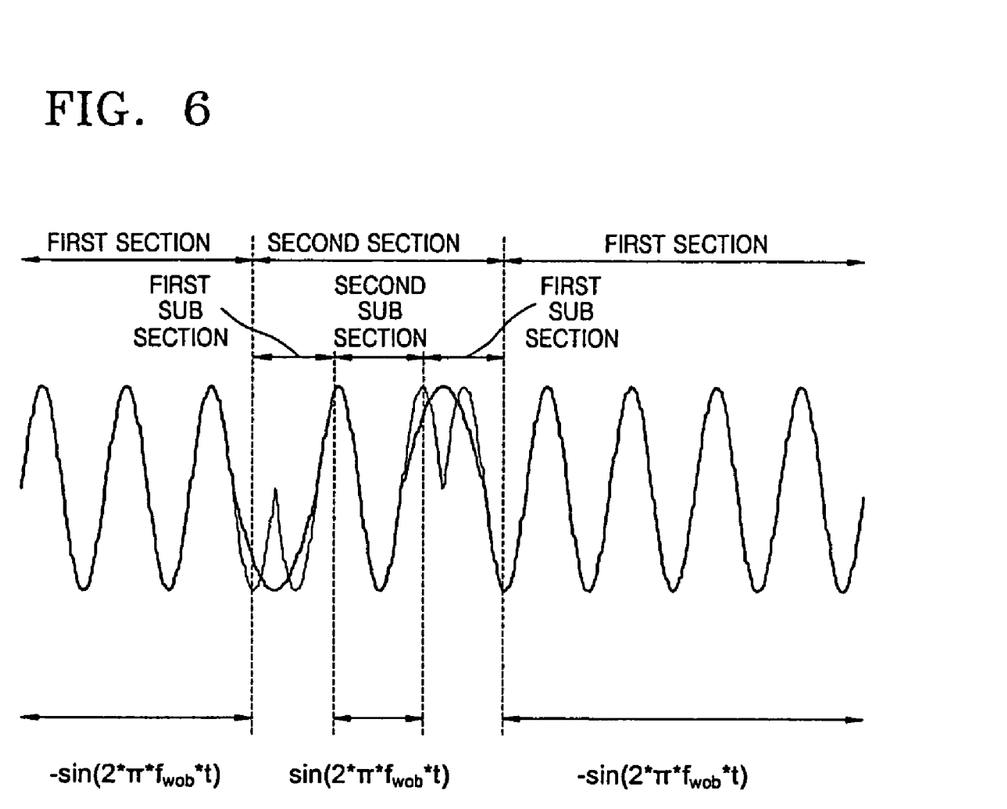
FIG. 6 illustrates modified BPSK modulation according to an aspect of the present invention.

FIG. 6 illustrates a modified BPSK modulation according to an aspect of the present invention.

When forming a disc track using a wobble, the following must be considered. A section where a PLL can be stably used with respect to a wobble signal generated at a formed disc track must be secured. For example, a disc track may be formed using a wobble, such as a sine function or a cosine function that has a single frequency or a single period. Also, a section where information such as address information is to be recorded must be secured. The address information may be recorded in the disc track using a wobble signal whose frequency is different from that of a wobble generated in the section for the PLL or by changing the phase of the wobble generated in the section for the PLL.

A ratio of wobbles having single frequencies or single periods to other wobbles is preferably high for the use of the PLL. Accordingly, data is recorded using a wobble having a large detection margin for stable reading of information such as the address information.

Accordingly, a track is formed at the section for the PLL using a function with a single frequency or period and the phase of the function used in the section for the PLL is reversed at the section for recording the address information.

In FIG. 6, the first sections are monotone wobble sections for the PLL using a sine function having a wobble frequency $f_{wob}$, and a second section is a modified wobble section where information such as the address information is recorded. To change the phase of the sine function used in the monotone wobble sections, the second section uses a sine function whose frequency is half the wobble frequency $f_{wob}$. In this case, the difference between angles of inclination at points where these two functions meet is 50% of the angle of inclination of the wobble frequency $f_{wob}$.

Also, the second section includes two first sub sections using a function at a frequency that is half the frequency of a function used in the monotone wobble section, and a second sub section using a function with a different phase at the same frequency as the function used in the monotone section.

The functions, shown in FIG. 6, for the BPSK modulation are as follows:

First sections: $-\sin(2*\pi*f_{wob}*t)$

Second section: One first sub section: (see Equation (1)),

Second sub section: $\sin(2*\pi*f_{wob}*t)$,

Another first sub section: (see Equation (2)).

$$-\sin(2*\pi*f_{wob}/2*t) \qquad (1)$$

$$\sin(2*\pi*f_{wob}/2*t) \qquad (2)$$

Figure 7:
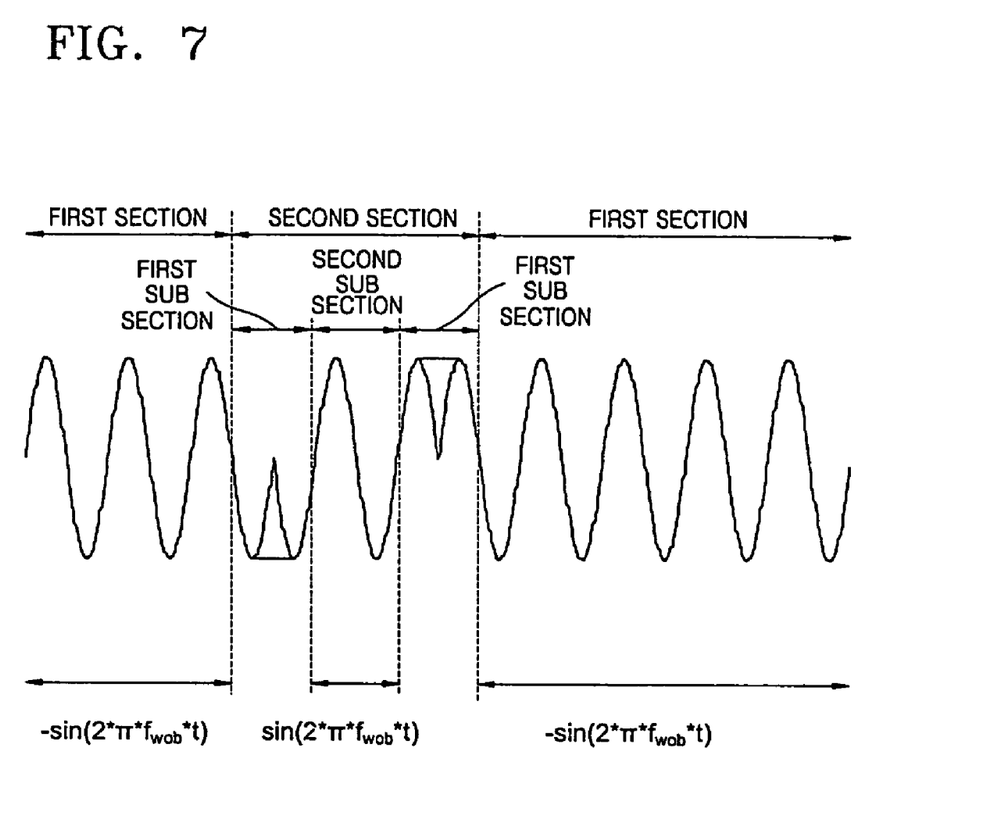
FIG. 7 illustrates modified BPSK modulation according to another aspect of the present invention.

FIG. 7 illustrates a modified BPSK according to another aspect of the present invention. Referring to FIG. 7, first sections are monotone wobble sections for the PLL using a sine function at a wobble frequency of $f_{wob}$. A second section is a modified wobble section where information such as address information is recorded. As compared to the first sections, the second section uses a function at a wobble frequency of $f_{wob}$, but the sign of the sine function is reversed in a zone of the second section where the phase of the sine function is to be changed. Also, the maximum value (+1) or minimum value (−1) of the sine function is maintained in a zone of the second section where discontinuities of a wobble are likely to occur, thereby preventing the occurrence of the discontinuities of the wobble.

The functions, shown in FIG. 7, for the BPSK modulation are as follows:

First sections: $-\sin(2*\pi*f_{wob}*t)$

Second section: One first sub section: (see Equation (3)),

Second sub section: $\sin(2*\pi*f_{wob}*t)$,

Another first sub section: (see Equation (4)).

$$-\sin(2*\pi*f_{wob}*t), nT \leq t < (n+0.25)T-1, (n+0.25)T \leq t < (n+0.75)T \sin(2*\pi*f_{wob}*t), (n+0.75)T \leq t < (n+1)T \qquad (3),$$

wherein n and T denote an integer and a period of the sine function, respectively.

$$\sin(2*\pi*f_{wob}*t), mT \leq t < (m+0.25)T+1, (m+0.25)T \leq t < (m+0.75)T - \sin(2*\pi*f_{wob}*t), (m+0.75)T \leq t < (m+1)T \quad (4),$$

wherein m and T denote an integer and a period of the sine function, respectively.

Figure 8:
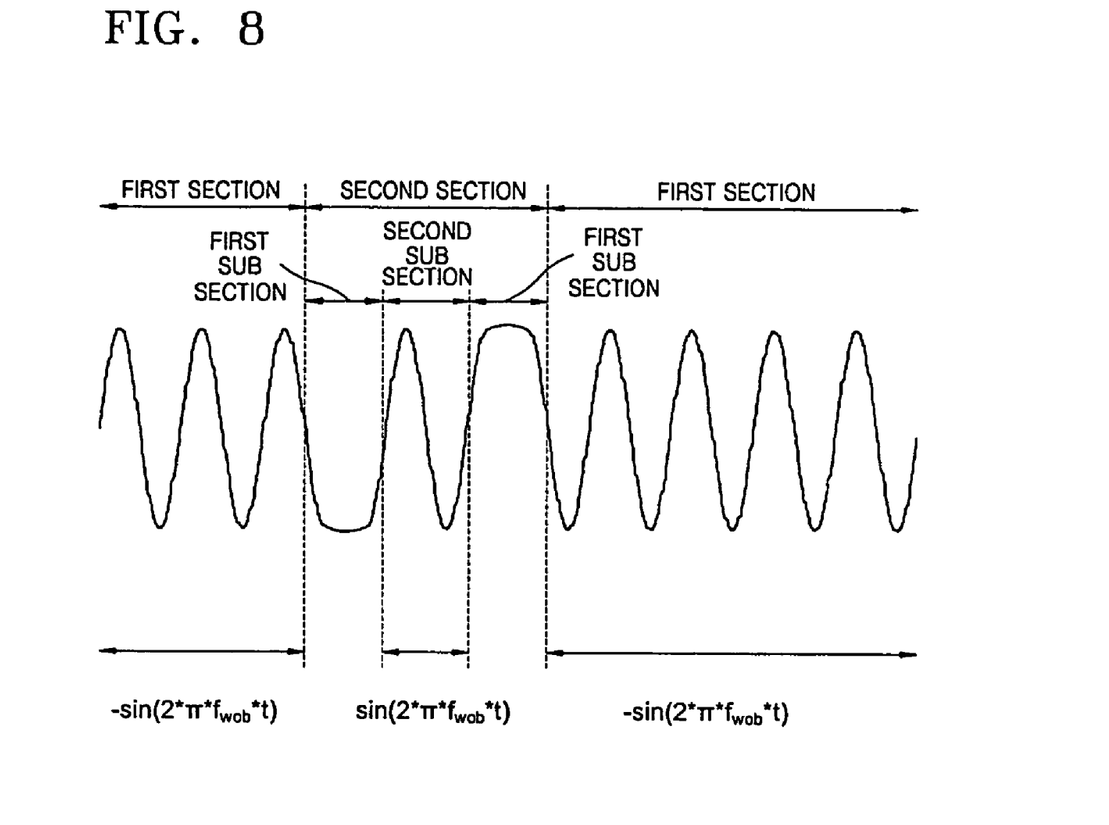
FIG. 8 illustrates modified BPSK modulation according to yet another aspect of the present invention.

Referring to FIG. 8, the first sections are monotone wobble sections for the PLL using a sine function at a wobble frequency of $f_{wob}$, and a second section is a modified wobble section for address information using a function whose phases are different from that of the function used in the first sections.

Referring to FIG. 8, the difference between primary differential values, i.e., angles of inclination, at points where the functions in the first and second sections meet is less than 50% of the wobble frequency of $f_{wob}$. The function used in the second section has a point where a primary differential value is 0 and does not undergo discontinuity of a wobble. Accordingly, it is possible to prevent a reduction in a rate of detecting a wobble signal even when harmonic noise caused by discontinuities in the wobble signal increases and an offset occurs in binarizing the wobble signal.

The functions illustrated in FIG. 8 can be expressed as follows:

First sections: $-\sin(2*\pi*f_{wob}*t)$

Second section: One first sub section: (see Equation (5)),

Second sub section: $\sin(2*\pi*f_{wob}*t)$,

Another first sub section: (see Equation (6)).

$$\{2*(t-R_a)*f_{wob}\}^4 - 1 \quad (5),$$

$$1 - \{2*(t-R_a)*f_{wob}\}^4 \quad (6),$$

wherein $R_a = [t*f_{wob}]/f_{wob} + 1/(2*f_{wob})$ where $[t*f_{wob}]$ is the maximum integer that does not exceed $t*f_{wob}$. In other words, the function [a] represents the maximum integer that does not exceed the number a.

The present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave, such as a carrier wave that transmits data via the Internet, for example. The computer readable recording medium can be distributed among computer systems that are interconnected through a network, and the present invention may be stored and implemented as a computer readable code in the distributed system.

As described above, according to the present invention, additional information is recorded in an extensible format, thus preventing a reduction in the rate of detecting_additional information caused by miniaturization of recording medium. Further, a disc track formation method according to the present invention minimizes harmonics noise caused by discontinuities of a wobble signal.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disc type recording medium for recording information by forming a plurality of disc tracks, the medium comprising:
at least two first sections in which the disc tracks are formed using a first function having a first frequency; and
at least one second section in which the disc tracks are formed using a second function having a second frequency, which is less than the first frequency,
wherein the second section is positioned between the first sections, the second section is allotted to record address information for disc access and comprises two first sub sections using the second function and a second sub section using a third function having a frequency that is the same as the first frequency, and the third function has a different phase from a phase of the first function.

2. The medium of claim 1, wherein the first sections are used for a PLL and the first function has a single frequency.

3. The medium of claim 1, wherein the two first sub sections have the same frequency but different phases.

4. The medium of claim 1, wherein the second sub section is positioned between the first sub sections.

5. The medium of claim 1, wherein the second frequency is half of the first frequency.

6. A disc type recording medium for recording information by forming disc tracks, the medium comprising:
at least two first sections in which the disc tracks are formed using a first function, the first function having a primary differential value; and
at least one second section in which the disc tracks are formed using a second function, the second function having a primary differential value, wherein,
the second section is positioned between the first sections,
the difference between primary differential values of the first and second function at points where the first sections and the second section meet is less than 50% of the primary differential value of the first function, and
the second function used in the second section has a point at which the primary differential value is 0 or does not include discontinuities.

7. The medium of claim 6, wherein in the first section is used for a PLL and the function has a single frequency.

8. The medium of claim 6, wherein the second section is allotted to record address information for disc access and comprises two first sub sections using the second function and a second sub section using a third function having a frequency that is the same as a frequency of the first function,
wherein the second sub section is positioned between the first sub sections and the third function has a different phase from a phase of the first function.

9. The medium of claim 6, wherein the first function is expressed as $-\sin(2*\pi*f_{wob}*t)$ and the second function is expressed as $\{2*(t-R_a)*f_{wob}\}^4 - 1$ or $1 - \{2*(t-R_a)*f_{wob}\}^4$,
wherein $R_a = [t*f_{wob}]/f_{wob} + 1/(2*f_{wob})$ and $[t*f_{wob}]$ is a maximum integer that does not exceed $t*f_{wob}$.

10. A method of forming disc tracks for recording information, comprising:
forming disc tracks using a first function in a plurality of first sections of a disc type recording medium; and
forming disc tracks using a second function in a second section of the disc type recording medium,
wherein the first function and the second function have frequencies, and the frequency of the second function is less than the frequency of the first function,
the second section is positioned between the first sections, the second section is allotted to record address information for disc access and includes two first sub sections, each first subsection using the second function, and a second sub section using a third function having a frequency that is the same as the frequency of the first function, and the first function has a phase and the third function has a phase that is different than the phase of the first function.

11. The method of claim 10, wherein in the first section is used for a PLL.

12. The method of claim 11, wherein the first function has a single frequency.

13. The method of claim 10, wherein the second function used in each of the first sub sections has the same frequency but a different phase, and the second sub section is positioned between the first sub sections.

14. The method of claim 10, wherein the frequency of the second function is half the frequency of the first function.

15. A method of forming disc tracks for recording information, comprising:
   forming disc tracks using a first function in a plurality of first sections of a disc type recording medium, the first function having a primary differential value; and
   forming disc tracks using a second function in a second section of the disc type recording medium, the second function having a primary differential value,
   wherein the second section is positioned between the first sections and the difference between primary differential values of the first and second functions at points where the first sections and the second section meet is less than 50% of the primary differential value of the first function, and the second function has a point at which the primary differential value is 0 or does not include discontinuities.

16. The method of claim 15, wherein the first sections are used for a PLL.

17. The method of claim 16, wherein the first function has a single frequency.

18. The method of claim 15, wherein the second section is allotted to record address information for disc access and comprises two first sub sections using the second function and a second sub section using a third function having a frequency that is the same as the frequency of the first function,
   wherein the second sub section is positioned between the first sub sections, and the third function has a different phase from a phase of the first function.

19. The method of claim 15, wherein the first function is expressed as $-\sin(2*\pi*f_{wob}*t)$ and the second function is expressed as $\{2*(t-R_a)*f_{wob}\}^4-1$ or $1-\{2*(t-R_a)*f_{wob}\}^4$,
   wherein $R_a=[t*f_{wob}]/f_{wob}+1/(2*f_{wob})$ and $[t*f_{wob}]$ is a maximum integer that does not exceed $t*f_{wob}$.

20. The medium of claim 1, wherein the second frequency is 1/k times the first frequency, where k is a positive integer.

21. The method of claim 10, wherein the frequency of the second function is 1/n times the frequency of the first function, where n is a positive integer.

* * * * *